United States Patent Office

3,787,585
Patented Jan. 22, 1974

3,787,585
STABLE LACTONE SOLUTION
Ryuzo Ueno, 10–27, Nango-cho, Nishinomiya-shi, Tetsuya Miyazaki, 4–12, Inano-cho, Itami-shi, and Shigeo Inamine, 7–14, Takatsuka-cho, Nishinomiya, Hyogo-ken, Japan, and Saburo Kishi, 1–4–5, Kiyosu, Kashiwara-shi, Osaka-fu, Japan
No Drawing. Filed Nov. 19, 1971, Ser. No. 200,622
Claims priority, application Japan, Nov. 25, 1970, 45/103,259; July 15, 1971, 46/52,091
Int. Cl. 23b *3/10, 1/12;* A21d *2/14*
U.S. Cl. 426—212                3 Claims

ABSTRACT OF THE DISCLOSURE

Preparation of a stable solution of a lactone of an aldonic acid or uronic acid, which comprises dissolving the lactone in an alcohol together with at least one salt selected from the group consisting of alkali metal salts, alkaline earth metal salts and ammonium salts of organic acids or inorganic acids; and acid addition salts of amino acids.

---

The present invention relates to a stable lactone solution especially suitable as a food additive comprising a solution of a lactone of an aldonic acid or uronic acid in an alcohol.

Generally, lactones, when dissolved in water, become gradually hydrolyzed to acids, and the rate of hydrolysis becomes markedly higher with higher temperatures. Acids in general, when dissolved in water, reduce the pH of the resulting solutions, but in the case of lactones, the rate of decrease of pH is gradual at room temperature. Utilizing this property, lactones are used in the production of foodstuffs in order to prevent a pH decrease at high temperatures and reduce the pH during heating. For example, they find applications as swelling agents for bread and cakes, coagulating agents for soybean curd, pH reducing agents for paste goods of fish and animal flesh, etc.

In the foodstuff industry, attempts have been vigorously made to reduce the cost of production by automation and continuation of the manufacturing process for foodstuffs. However, when lactones are used as pH reducing agents, carrying out of the foodstuff manufacturing process becomes extremely difficult mainly because stable solutions of lactones cannot be obtained. Generally, the foodstuff producing process requires more than 30 minutes from the step of mixing materials to the heating stage. Addition of lactones to foodstuff materials from the outset is undesirable because of the decomposition of lactones to acids during the process. It has therefore been the practice to add lactones immediately before the heating stage. Since it is technically difficult to add small amounts (0.2–1%) of powders of lactones to foodstuff materials quantitatively and continuously, the lactones are added in the form of aqueous solutions. However, when dissolved in water, lactones will be hydrolyzed within 30 minutes to acids, and the rate of decomposition becomes extremely fast with higher temperatures. It is necessary therefore to prepare a fresh solution every 30 minutes, which renders the carrying out of the food manufacturing process extremely difficult.

For the above reason, the preparation of stable lactone solutions has been demanded in order to complete carrying out of the food manufacturing process.

In order to obtain such stable solutions, it is conceivable, for example, to adjust the pH and/or temperature of an aqueous solution of a lactone properly. The adjustment of the pH of the solution (generally, the decomposition rate becomes slower with increasing acidity value) is not particularly desirable because the solution itself is used as a pH adjusting agent for foodstuffs, although it may result in the stabilization of the solution. The inhibition of the decomposition of lactones by decreasing the temperature is not practical because at temperatures of 0 to 30° C. which are within the variations of the atmospheric temperature, the temperature control does not give marked effect of inhibiting the decomposition, and for greater effects, the temperature must be made extremely low, which temperature control can hardly be employed in an ordinary food manufacturing process. Furthermore, complete prevention of the decomposition of aqueous solutions of lactones is thermodynamically impossible.

Another method conceivable for obtaining stable solutions is to dissolve lactones in non-aqueous solvents. Since water is not substantially present according to this method, the decomposition of lactones does not occur at all, and the method seems to be promising. However, only some alcohols and animal and vegetable oils can be added to foodstuffs without causing toxicity problems, and the lactones are difficult to dissolve in these solvents. For example, gluconodeltalactone dissolves only in an amount of less than 1 g. in 100 g. of ethanol at room temperature, and is quite insoluble in oils. These compounds cannot be used as solvents for lactones.

Accordingly, an object of the present invention is to provide a stable solution of a lactone especially suitable as food additive as a result of discovering a method of dissolving lactones in alcohols.

Other objects of the present invention will become apparent from the following description.

It has been found that a solution obtained by dissolving a lactone of an aldonic acid in an alcohol together with at least one salt selected from the group consisting of alkali metal salts, alkaline earth metal salts and ammonium salts of organic acids or inorganic acids, and acid addition salts of amino acids is suited for these objects.

Alcohols having higher polarities are more advantageous for use in the present invention. Examples of the alcohols that can be used include monohydric alcohols such as methanol, ethanol, n-propylalcohol, or isopropyl alcohol, and polyhydric alcohols such as ethylene glycol, propylene glycol, or glycerol. The polyhydric alcohols are preferred for elevating the polarity. However, since polyhydric alcohols generally have high viscosity and lend themselves to difficult handling, it is preferred to mix them with monohydric alcohols having low viscosity. For example, if about 5–20% by weight of ethanol is added to propylene glycol, difficult handling in the event of temperature decrease resulting in high viscosity can be avoided.

Examples of the lactones of an aldonic acid or uronic acid used in the present invention are gluconolactone, arabinolactone, galactonolactone, mannolactone, and xylonolactone. Of these, arabinogammalactone and gluconodeltalactone are especially preferred.

Examples of the organic acids and inorganic acids which form salts to be dissolved in alcohols together with the lactones include propionic acid, sorbic acid, benzoic acid, dehydroacetic acid, or salicylic acid, all of which are well known as food antiseptics; glutomic acid, nucleotide, or aspartic acid, all of which are well known as seasonings; succinic acid, citric acid, gluconic acid, acetic acid, tartaric acid, lactic acid, carbon dioxide, fumaric acid, malic acid, alum, phosphoric acid, or adipic acid, all of which are well known as acidulants in food processing; saccharin or cyclohexanesulfonic acid, which are well known as sweetenings; acidic pyrophosphoric acid, pyrophosphoric acid, metaphosphoric acid, primary phosphoric acid, secondary phosphoric acid, tertiary phosphoric acid, stearyllactic acid, or bromic acid, which are well known as quality-improving agents; ascorbic acid, nicotinic acid, panthothenic acid, folic acid, or riboflavinphosphoric acid esters, which are well known as strengthening agents; Erythorbic acid, well known as an anti-oxidant; alginic acid, casein, chondroitinsulfuric acid, cellulose glycolic acid, starch glycolic acid, starch phosphoric acid esters, or polyacrylic acid known as viscosity-increasing agents; and hydrochloric acid, sulfuric acid, nitric acid, sulfurous acid, or nitrous acid. Alkali metal salts, alkaline earth metal salts and ammonium salts of these organic and inorganic acids are useful in the present invention.

Besides these salts, acid addition salts such as benzoyl-thiamine hydrochloride, thiamine hydrochloride, thiamine nitrate, thiamineacetyl sulfate, thiaminethiocyanate, thiaminenaphthalene-1,5-disulfonate, thiaminenaphthalene-2,6-disulfonate, thiaminenaphthalate, thiaminelauryl sulfate, pyridoxine hydrochloride, histidine hydrochloride, lysineaspartate, lysine hydrochloride, lysine-glutamate, alginine-glutamate, alginine-aspartate, or choline-phosphate can also be used.

Also alkali metal salts, alkaline earth metal salts and ammonium salts of organic acids such as caproic acid, caprylic acid, capric acid, lauric acid, myristic acid, palmitic acid, stearic acid, arachic acid, behenic acid, zoomaric acid, oleic acid, linoleic acid, linolenic acid, gadoleic acid, erucic acid, or ricinoleic acid can be used.

Generally, salts of weak acids with strong bases are preferred for use in the present invention. Especially preferred are sodium acetate, sodium propionate, potassium sorbate, sodium sorbate, sodium dehydroacetate, sodium citrate, sodium malate, sodium glutamate, and ribonucleotide sodium.

Some of these contain a small amount of water or water of crystallization. Since, however, a moisture content of an extent which does not remarkably decompose lactones is permissible for production of foodstuffs, the salts need not be totally anhydrous.

Generally speaking, salts well soluble in alcohols produce an effect of increasing the solubilities of lactones, and the alkali metal salts are more effective than the alkaline earth metal salts. These metal salts are difficultly soluble in alcohols, but when dissolved together with lactones, they not only increase the solubilities of lactones but also have increased solubility themselves.

The amounts of the salts to be added vary depending upon the contents of lactones in the alcohol solutions, and if the lactone content is large, the amounts of the salts will naturally become larger. The optimum amount of addition also varies according to the type of the salts, and salts having a smaller molecular weight prove effective when used in lesser amounts. The largest amounts of salts that can be added are naturally restricted by the solubility of the salts in the alcohols. Therefore, if the solubility of the salt in alcohol is low, the solubility of it in lactones also becomes low. For the same kind of alcohols, the largest solubility of lactones is restricted by the saturation solubility of the salts in the alcohols. Salts having a larger molecular weight in general must be added in larger amounts.

The lactone content of the solution of the present invention is usally from 1 to 30%, the salt content is 0.1 to 30%, and the alcohol content is at least 40%. These contents vary according to the foodstuffs used. The solution of the present invention may also contain other food additives soluble in alcohols, the examples of which are 2-(2'-furyl)-3-(5'-nitro-2'-furyl)-acrylamide, paraoxybenzoic acid ester, or other antiseptics, an antioxidant such as BHA or BHT, or various coloring agents, flavor-giving agents, surface active agents, or vitamins.

The stable solution according to the present invention can be produced by mixing the alcohol, lactone and salt, and heating the mixture at 70–120° C. If the mixing proportions are suitable, no crystals are precipitated even when the solution is cooled after complete dissolving.

Using gluconodeltalactone as the lactone, for example, when water is added to the solution obtained in the above-mentioned manner and the solution is neutralized with sodium hydroxide followed by addition of alcohol, crystals identified as sodium gluconate are precipitated as a result of various analytical procedures. It is clear that this solution is not formed by chemical reaction.

The addition of the solution obtained in the present invention to foodstuffs is performed by dropping, spraying, and other procedures generally used for adding additives to foodstuffs.

The invention will further be described specifically by the following non-limitative examples. In each of the examples, all percentages are by weight.

EXAMPLES 1–2

To 695 g. of propylene glycol 300 g. of gluconodeltalactone and 5 g. of sodium acetate were added, and the mixture was heated with stirring. When the temperature reached the vicinity of 120° C., gluconodeltalactone and sodium acetate were completely dissolved to form a clear solution. Cooling of this solution did not lead to the precipitation of crystals, and a stable solution of gluconodeltalactone could be obtained.

The above procedure was repeated except that ethylene glycol was used instead of propylene glycol (Example 2). A stable solution of gluconodeltalactone was obtained.

EXAMPLES 3–5

Using sodium propionate (Example 3), sodium benzoate (Example 4), or potassium sorbate (Example 5) instead of sodium acetate in Example 1, the same procedure as in Example 1 was repeated. As in Example 1, a clear stable solution of gluconodeltalactone was obtained.

EXAMPLE 6

Potassium (II) phosphate (5 g.) was added to 745 g. of propylene glycol and 250 g. of gluconodeltalactone, and the mixture was heated to about 120° C. with stirring to produce a clear solution. When the solution was cooled to room temperature with cold water, a stable solution of gluconodeltalactone was obtained.

EXAMPLE 7

To 645 g. of glycerol 350 g. of gluconodeltalactone and 5 g. of sodium acetate were added, and the mixture was heated with stirring. At about 110° C., the dissolving became complete to form a clear solution. Cooling of the solution to room temperature no longer yielded crystals, and a stable solution of gluconodeltalactone was obtained.

EXAMPLE 8

Sodium acetate (10 g.) was added to 890 g. of ethanol and 100 g. of gluconodeltalactone, and the mixture was put into a three-necked flask equipped with a stirrer and a cooling tube. When heated in a water bath at 90° C. with stirring, the dissolving became complete and a clear solution resulted. Cooling of the solution to room temperature with cold water did not yield a precipitate of crystals, and a stable solution of gluconodeltalactone was obtained.

EXAMPLE 9

Gluconodeltalactone (300 g.) and 5 g. of sodium glutamate were added to 695 g. of ethylene glycol, and the mixture was heated with stirring. At about 110° C., the dissolving became complete. As a result, a stable solution of gluconodeltalactone was obtained which did not precipitate crystals even when cooled to room temperature.

EXAMPLE 10

Gluconodeltalactone (300 g.) and 50 g. of sodium inosinate were added to 550 g. of propylene glycol, and the mixture was heated with stirring to about 120° C. to dissolve them completely. The solution was cooled with cold water to about 80° C., and then 100 g. of ethanol were added. The solution was stirred to form a uniform solution which was then cooled to room temperature. As a result, a solution of glyconodeltalactone was obtained which is of low viscosity and stable and contains glyconodeltalactone in a high concentration.

EXAMPLES 11-12

Gluconodeltalactone (150 g.) and 3 g. of anhydrous ammonium alum were added to 847 g. of propylene glycol, and the mixture was heated to 120° C. with stirring. When the resultant solution was cooled to room temperature, a stable solution of glyconodeltalactone was obtained.

The above procedure was repeated except using calcium propionate instead of the ammonium alum (Example 12). A stable solution of gluconodeltalactone was similarly obtained.

EXAMPLE 13

Gluconodeltalactone (150 g.) and 2 g. of magnesium carbonate were added to 848 g. of propylene glycol, and the mixture was heated to 120° C. Magnesium carbonate inevitably contained a small amount of MgO which remained in the solution in the form of fine crystals and rendered the solution whitely turbid. However, gluconodeltalactone was completely dissolved, and even when the solution was cooled to room temperature, the crystals of gluconodeltalactone were not precipitated. The fine particles of MgO in the solution had a particle size of not more than one micron, and the amount of these particles was small. Therefore, even on storage for prolonged periods of time, MgO did not settle, and there was no trouble in using the solution.

EXAMPLE 14

Arabinogammalactone (300 g.) and 5 g. of sodium acetate anhydride were added to 695 g. of propylene glycol, and the mixture was heated to 100° C. with stirring. When the resultant solution was cooled with cold water to room temperature, the crystals of arabinogammalactone were not precipitated, but a stable solution was obtained.

EXAMPLE 15

Gluconodeltalactone (90 g.) and 10 g. of lysine hydrochloride were added to 900 g. of propylene glycol, and the mixture was heated to about 110° C. to dissolve them completely. Subsequent cooling of the solution to room temperatures gave a stable solution of gluconodeltalactone.

EXAMPLE 16

The gluconodeltalactone solution obtained in Example 1 was stored for one month at 37° C., and then diluted with water to 100 times its original weight (corresponding to a gluconodeltalactone concentration of 0.3%). Immediately after dilution, the pH of the solution was measured. Then, the solution was heated to 95° C., and cooled to room temperature, followed by measurement of the pH of the solution so treated. Under the same conditions, the pH measurement was made as to control solution I (an aqueous solution of gluconodeltalactone crystals in a concentration of 0.3%), and control solution II (obtained by dissolving gluconodeltalactone crystals in water in a concentration of 30%, allowing it to stand for 30 minutes at 26° C., and then diluting it to a gluconodeltalactone concentration of 0.3%). The results are shown in the following table.

| Samples | pH immediately after dissolving | pH after heating | Difference in pH |
| --- | --- | --- | --- |
| Solution of this invention | 4.70 | 4.15 | 0.55 |
| Control solution I | 4.25 | 3.65 | 0.60 |
| Control solution II | 3.85 | 3.68 | 0.17 |

These results demonstrate that with the gluconodeltalactone solution of the present invention, a pH reduction by heat is almost equivalent to the case with the crystals of gluconodeltalactone, and the solution of this invention retained its properties even when allowed to stand for a month at 37° C. On the contrary, a 30% aqueous solution of gluconodeltalactone undergoes gradual decomposition of gluconodeltalactone even when allowed to stand for 30 minutes at room temperature. When this solution was diluted with water to a concentration of 0.3% as gluconodeltalactone, pH reduction occurred immediately.

EXAMPLE 17

A mixture of 49.95% glycerol, 10% ethanol, 30% gluconodeltalactone, 10% sodium acetate and 0.05% thiaminelaurylsulfate was heated, and the resulting solution was cooled to room temperature to prepare a lactone solution of this invention.

To 2 kg. of wheat flour 880 g. of water and 6 g. of common salt were added. While kneading the mixture, 20 g. of the solution obtained above were added. The resultant mixture was passed through rollers, and then allowed to stand for 15 minutes. Then, it was cut with a roller to the form of noodles. The noodles were heated at 100° C. for 20 minutes with subsequent removal of water to produce boiled noodles.

EXAMPLE 18

A mixture of 69.2925% propylene glycol, 30.0% gluconodeltalactone, 0.7% sodium citrate and 0.0075% 2-(2″-furyl)-3-(5′-nitro-2′-furyl) acrylamide was heated. The resultant solution was cooled to room temperature to form a lactone solution of this invention.

In a customary manner, soybean milk for package soybean curd was prepared, and cooled to 30° C. 300 g. of the soybean milk were packed in a casing together with 3 g. of the lactone solution as a coagulating agent. After sealing, it was heated for 40 minutes at 90° C. to produce packaged soybean curd.

According to the present method, a stable gluconodeltalactone solution can be produced in large quantities.

EXAMPLE 19

Product of kamaboko (boiled fish paste)

A mixture of 20% gluconodeltalactone, 14% potassium sorbate, 0.0166% 2-(2″-furyl)-3-(5′-nitro-2′-furyl) acrylamide and 65.9834% propylene glycol was heated, and the resulting solution was cooled to room temperature to prepare a lactone solution.

Refrigerated minced fish flesh (10 kg.) and 250 g. of common salt were put in a mill, and milled for 30 minutes. Then, 150 g. of the lactone solution were added, followed by further milling for 15 minutes. The minced flesh was then applied to a plate, and molded, steamed for 30 minutes at 90° C., and allowed to cool to produce kamaboko.

According to this method, gluconodeltalactone and common salt as a food additive can be stored in advance as a uniform solution. The solution is well dispersible in raw material (such as soybean milk or minced fish flesh), and the complete automation of the operation is possible.

EXAMPLE 20

A mixture of 63.20% propylene glycol, 20.00% arabinogammalactone, 16.67% potassium sorbate, and 0.13% 2-(2″-furyl)-3-(5′-nitro-2′-furyl)-acrylamide was heated, and the solution was cooled to room temperature to form a lactone solution.

A fish sausage material consisting of 45 kg. of minced flesh of horse-mackerel, 20 kg. of minced flesh of lockington, 22 kg. of minced flesh of pollack, 9.5 kg. of starch, 1.2 kg. of gluten, and 2.3 kg. of seasonings and pepper was mixed for 15 minutes by a silent cutter. 1.5 kg. of the above lactone solution was added to the mixed material, and the mixture was mixed for another 5 minutes. The resultant mixture was packed into a tube of polyvinylidene chloride. After sealing, the mixture was heated for one hour at 88° C. Then, the mixture was cooled with water for 45 minutes, and then immersed in boiled water to stretch out the creases, followed by cooling to produce fish sausage.

EXAMPLE 21

A mixture of 70% propylene glycol, 20% gluconodeltalactone and 10% sodium propionate was heated to 100° C., and the solution was cooled to room temperature to prepare a lactone solution.

To 4 kg. of wheat flour, 2.2 kg. of water, 240 g. of sugar, 160 g. of baker's yeast, 160 g. of shortening, 72 g. of common salt, 4 g. of a fermentation promoter, and 70 g. of the solution obtained above were added, and they were kneaded for 15 minutes by a large-sized mixer to obtain a dough. The dough was allowed to stand for 30 minutes at 30° C., and divided into 500 g. portions. Each portion was packed in a rectangular bread-making form after having been allowed to stand for 10 minutes at 30° C. It was then heated for 30 minutes in a steaming oven at 38° C. and baked for 20 minutes in an electric oven at 210° C. to make bread.

EXAMPLE 22

A mixture consisting of 54.7% propylene glycol, 10% glycerol, 20% gluconodeltalactone, 13.3% potassium sorbate, and 2% 5'-ribonucleotide sodium was heated to 95%, and the solution was cooled to room temperature to form a lactone solution.

1.7 kg. of hog-meat and 1.4 kg. of mutton were soaked in common salt for 24 hours, and then minced. The minced raw material was mixed with 0.3 of lard, 1.0 kg. of water, 15 g. of sugar, 20 g. of sodium glutamate, 20 g. of pepper, and 66 g. of the lactone solution prepared above using a silent cutter for 15 minutes to form a flesh emulsion. This flesh emulsion was packed into a sheep intestine by means of an air stuffer, dried at 80° C. for 20 minutes, steamed for 15 minutes at 80° C., allowed to cool, and then dried for 3 minutes at 80° C. to make sausage.

We claim:

1. A stable lactone solution useful as a pH reducing agent for foodstuffs consisting essentially of 1–30% by weight of a lactone selected from gluconodeltalactone, arabinolactone, galactonolactone, mannolactone and xylonolactone, 0.1–30% by weight of at least one edible salt selected from the group consisting of alkali metal salts, alkaline earth metal salts and ammonium salts of organic acids or inorganic acids and acid addition salts of amino acids and at least 40% by weight of an edible alcohol.

2. The solution of claim 1, wherein said lactone is gluconodeltalactone.

3. The solution of claim 1, wherein said lactone is arabinogammalactone.

References Cited
UNITED STATES PATENTS 3,122,442   2/1964   Sair _____ 99—159 X
3,526,521   9/1970   Komarik _____ 99—159

A. LOUIS MONACELL, Primary Examiner

J. R. HOFFMAN, Assistant Examiner

U.S. Cl. X.R.

260—343.5, 343.6; 426—226

UNITED STATES PATENT OFFICE
CERTIFICATE OF CORRECTION

Patent No. __3,787,585__  Dated __January 22, 1974__

Inventor(s) __Ryuzo UENO ET AL__

It is certified that error appears in the above-identified patent and that said Letters Patent are hereby corrected as shown below:

IN THE HEADING:

Insert the following: -- Assignors to Ueno Fine Chemical Industries, Ltd. of Osaka, Japan --

IN THE CLAIMS:

Column 8, Claim 1, line 3 thereof: cancel "gluconodeltalactone," and substitute therefor -- gluconolactone, --

Signed and sealed this 21st day of May 1974.

(SEAL)
Attest:

EDWARD M.FLETCHER,JR.
Attesting Officer

C. MARSHALL DANN
Commissioner of Patents